United States Patent
Buehler et al.

[11] 3,908,189
[45] Sept. 23, 1975

[54] AIRBORNE RADAR INSTRUMENT LANDING SYSTEM

[76] Inventors: Walter E. Buehler, 5344 232nd Ave., S.E., Issaquah, Wash. 98027; Clarence D. Lunden, Rt. 2, Box 890, Tacoma, Wash. 98423

[22] Filed: June 27, 1973

[21] Appl. No.: 374,167

Related U.S. Application Data

[62] Division of Ser. No. 210,448, Dec. 21, 1971, Pat. No. 3,787,841.

[52] U.S. Cl............ 343/5 LS; 343/18 D; 343/109
[51] Int. Cl............................................ G01s 1/114
[58] Field of Search............ 343/5 LS, 18 D, 108 R, 343/109

[56] References Cited
UNITED STATES PATENTS

| | | | |
|---|---|---|---|
| 2,604,621 | 7/1952 | Earp et al............ | 343/5 LS |
| 2,871,470 | 1/1959 | Stephenson............ | 343/5 LS |
| 3,181,153 | 4/1965 | Cella............ | 343/5 LS |
| 3,648,285 | 3/1972 | Sanders............ | 343/5 LS |
| 3,671,967 | 6/1972 | Fries............ | 343/109 |
| 3,716,855 | 2/1973 | Asam............ | 343/5 LS |

OTHER PUBLICATIONS

M. I. Skolnik, Radar Handbook, McGraw-Hill, 1970, pp. 5-20 to 5-23.

*Primary Examiner*—Maynard R. Wilbur
*Assistant Examiner*—G. E. Montone

[57] ABSTRACT

An ILS (instrument landing system) utilizing a modified weather radar system of the aircraft and a retrodirective antenna located at the touchdown point and modulated so as to generate conventional guidance commands (fly up/fly down and fly right/fly left) signals from signal processing of the video output of the weather radar aboard the aircraft.

1 Claim, 23 Drawing Figures

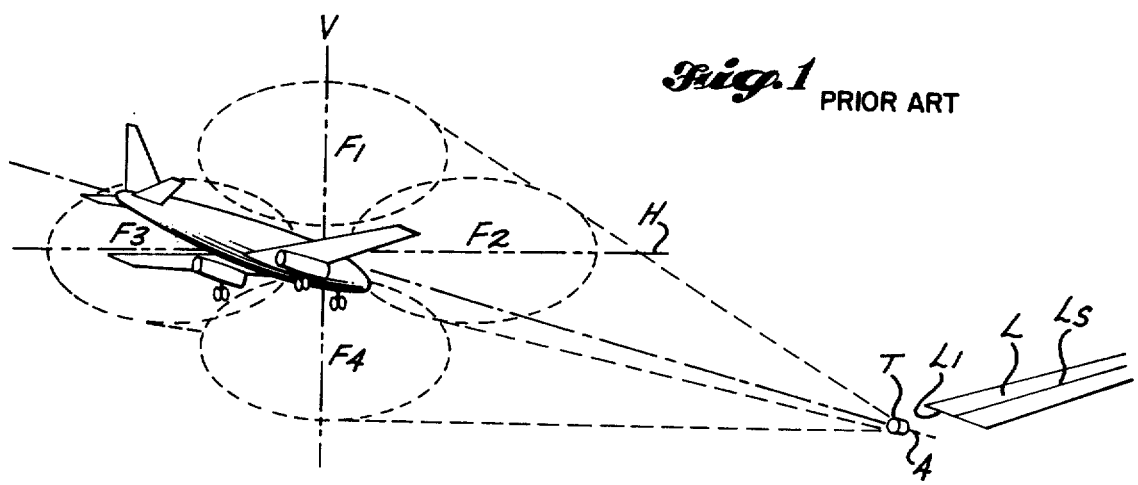
Fig. 1 PRIOR ART
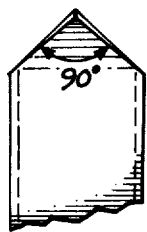
Fig. 4
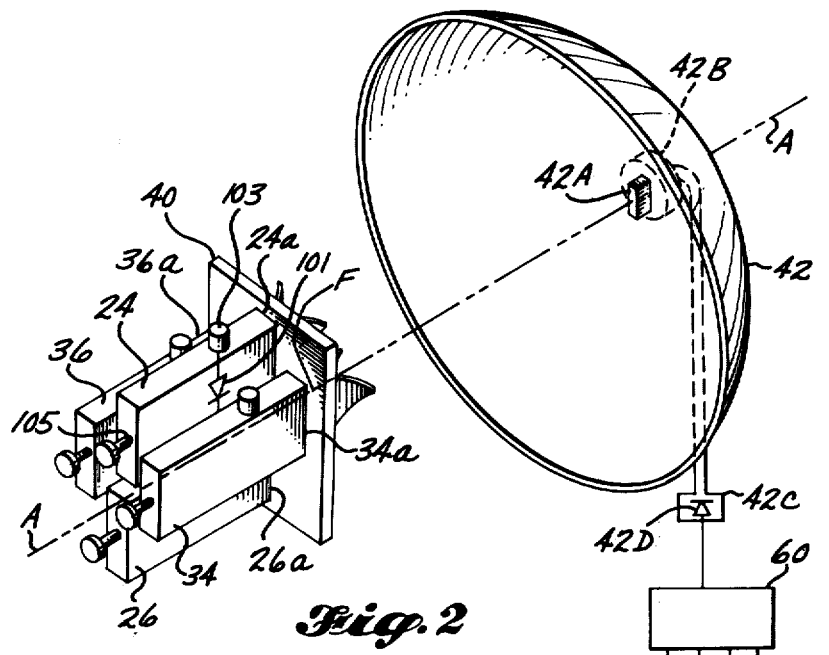
Fig. 2
Fig. 5
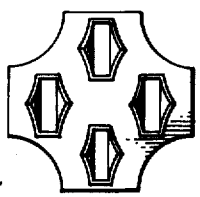
Fig. 3
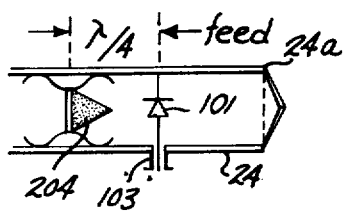
Fig. 6
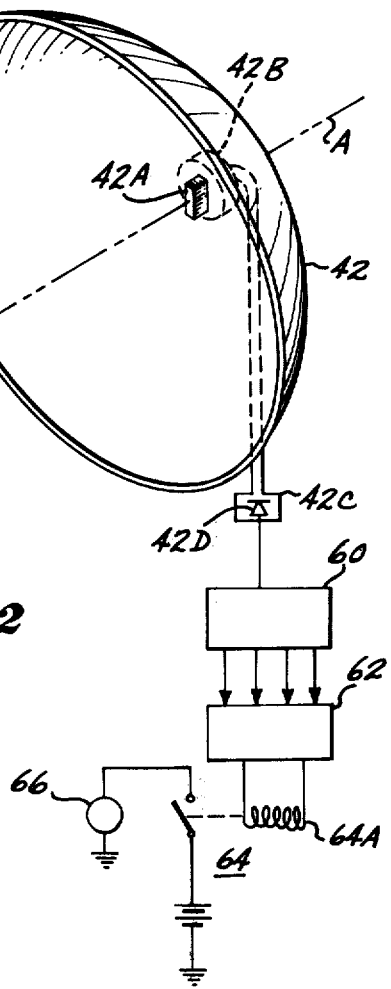

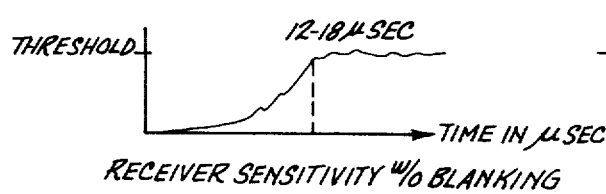
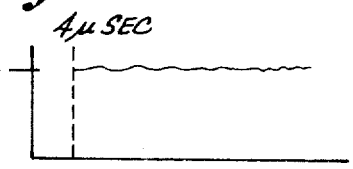
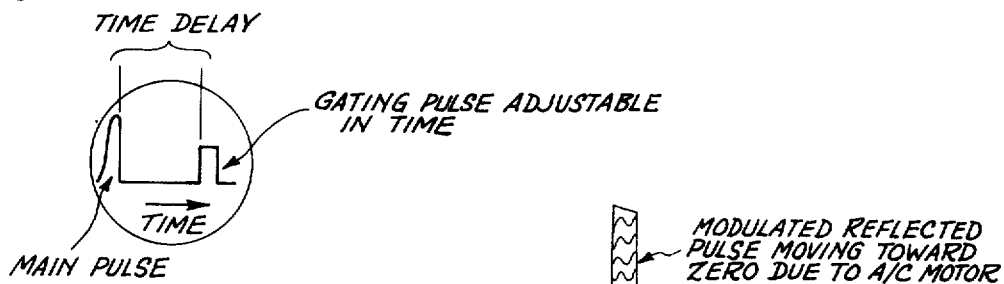
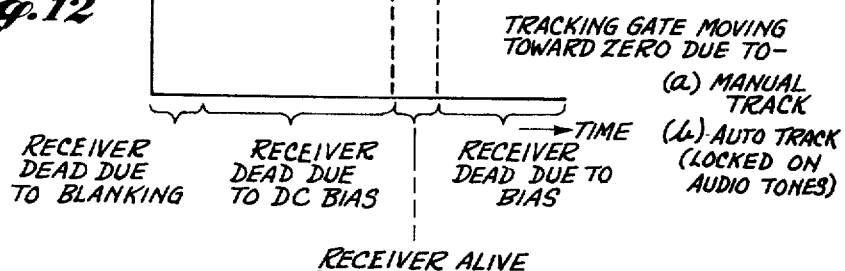
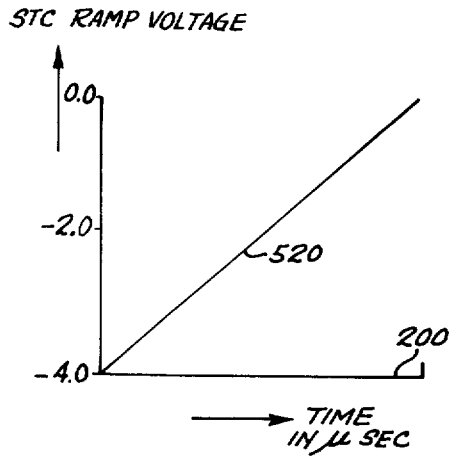
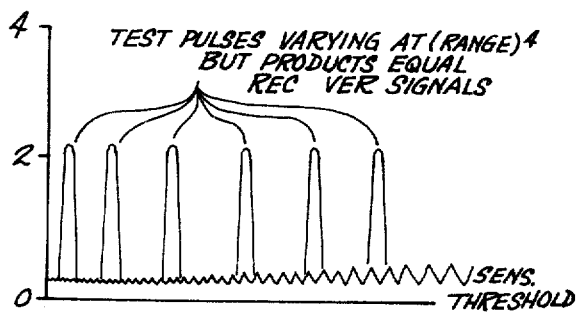

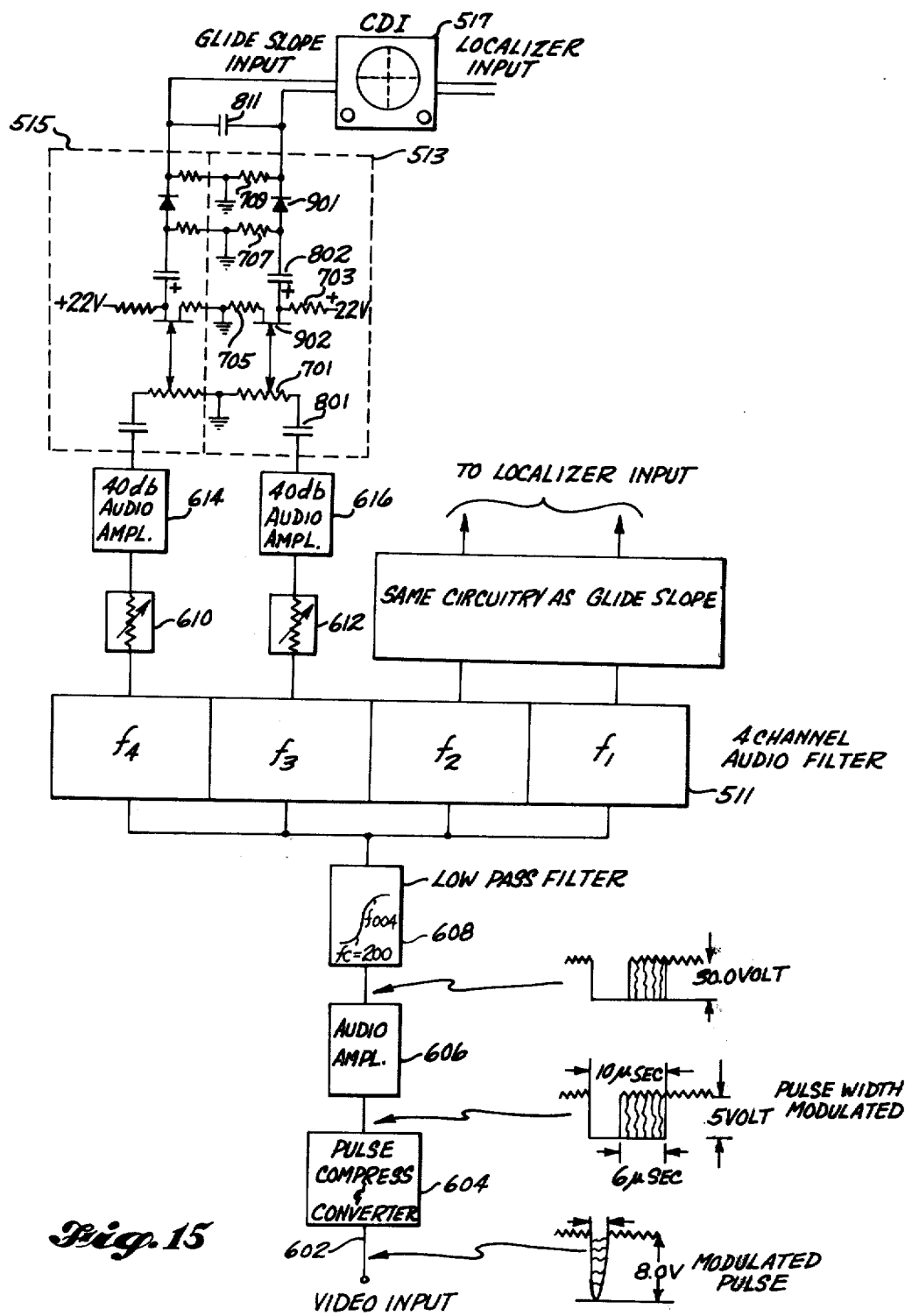

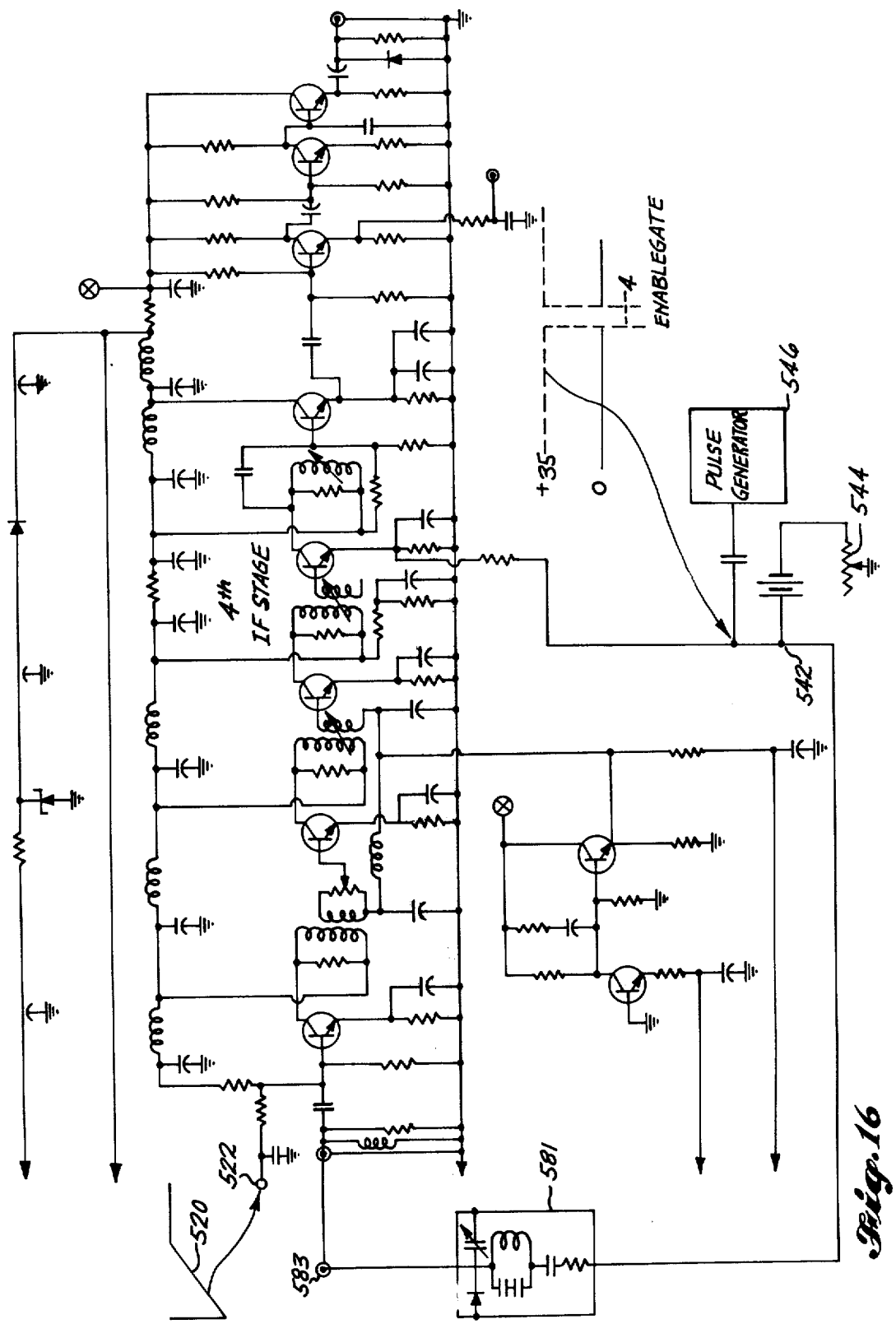

3,908,189

AIRBORNE RADAR INSTRUMENT LANDING SYSTEM

This is a division of application Ser. No. 210,448, filed Dec. 21, 1971, now U.S. Pat. No. 3,787,841.

This invention relates to ILS and more particularly to a microwave ILS utilizing already available weather radar systems modified for use with low cost ground equipment, viz. a modulated antenna system located substantially at touchdown.

Present ILS are limited by course bending due to multipath interference from fixed and variable sources acting as reflectors such as hangars, departing aircraft and vehicular traffic close to runways. Changes in foreground conditions (weather) in the beam forming area of glide slope antennas have also resulted in glide slope inaccuracies. Much effort has been expended in the past to reduce these shortcomings and ILS systems state of the art improvements have resulted; among them the development of the high-gain waveguide localizer in current use at about 20 airports in the United States. Despite current state of the art improvements, current ILS, dating from developments during the period 1937–43, has two fundamental shortcomings:

1. the operating frequencies (100 and 300 MHz) are probably too low (wavelength too long) to generate the precise reflection-free beams need for terminal guidance, and 2. the ground antenna locations, due partly to the bulkiness of 1 and 3 meter antennas, are not at the aim point (1000 feet from threshold along runway centerline) but are offset, each normal to the plane of the respective vertical or lateral guidance signal, all to meet the obvious requirement that the runway must be kept "clean."

It is accordingly an object of the present invention to provide a microwave ILS system comprising airborne radar system arrangements and ground supported retrodirective antenna arrangements.

It is a further object of this invention to utilize modified weather radar systems and modulated ground based reflectors for ILS.

It is still another object of this invention to provide means including a weather radar system for generating conventional guidance commands and slant range to touchdown signals representative of height above the runway.

It is yet another object of the invention to provide low cost ILS landing systems in the microwave range utilizing modifications of the weather radar system already available aboard the aircraft in combination with a low cost retrodirective passive reflector arrangement on the ground to form a modulated four lobe pattern return.

In accordance with one embodiment of the present invention transmitted radar signals aboard the aircraft are directed to impinge upon a reflecting antenna arrangement having antenna impedance switching for modulating the backscatter signal amplitude returned to the illuminating radar at the switching frequencies. Radar receiver detection of the returning radar energy comprises a video signal containing the modulating (switching) frequencies generated by the reflecting antenna arrangement which are further processed to provide guidance information signals which may be coupled to drive conventional CDI (course deviation indicator) needle pointers or to an autopilot. A further feature comprises gate generator means in the receiver to provide slant range information useful in determination of height above the runway.

Referring now to the drawings:

FIG. 1 is a diagrammatic illustration of the landing system beam pattern and runway relationship for guiding an airplane, the arrangement being generally typical of conventional four lobe ILS systems;

FIG. 2 is a schematic diagram of a first embodiment of a passive antenna arrangement for modulating and reflecting incident microwave energy which may be used in the system;

FIG. 3 is a front view of a radiator element cluster viewed from the inside of a reflector associated therewith;

FIG. 4 is a face view (i.e., perpendicular to a broad side) and FIG. 5 is a side view of waveguide terminal radiator element for directing energy against the retrodirective energy transmitting paraboloid reflector;

FIG. 6 is a cross sectional view of a waveguide modulator arrangement;

FIGS. 9 and 10 are graphs showing receiver sensitivity versus time with and without blanking;

FIG. 11 is a graphical representation of the gating pulse with respect to the main pulse of the radar transmitter;

FIG. 12 is a graph showing the function of the enable gate in the receiver system along a time axis;

FIG. 13 is a graph showing the ramp waveform applied to the radars STC circuit to achieve the receiver sensitivity along a time base as shown in FIG. 14;

FIG. 14 is a plot of receiver sensitivity along a time axis;

FIG. 15 is a schematic diagram showing video processing circuitry for taking video output from the radar receiver and providing D.C. level signals of the type utilized by a CDI indicator;

FIG. 16 is a schematic diagram of the I.F. amplifier in an AVQ–10 type incorporating blanking and enable pulse generating circuitry necessary in practicing an embodiment of the present invention;

Figure 19:
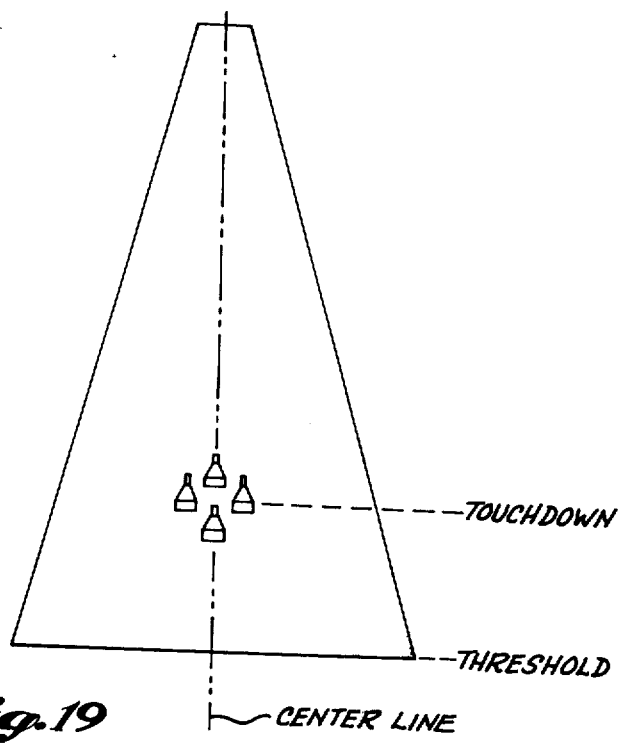
Figure 20:
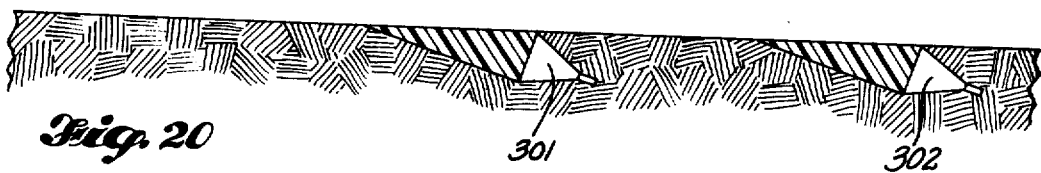
Figure 21:
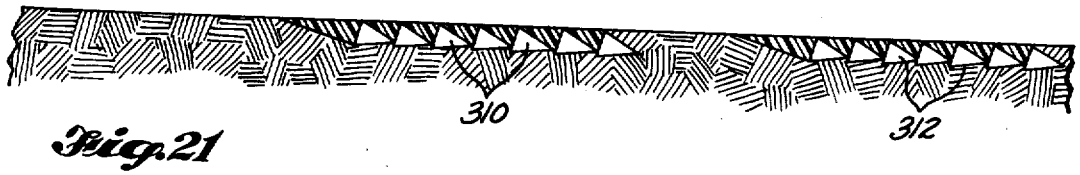
Figure 22:
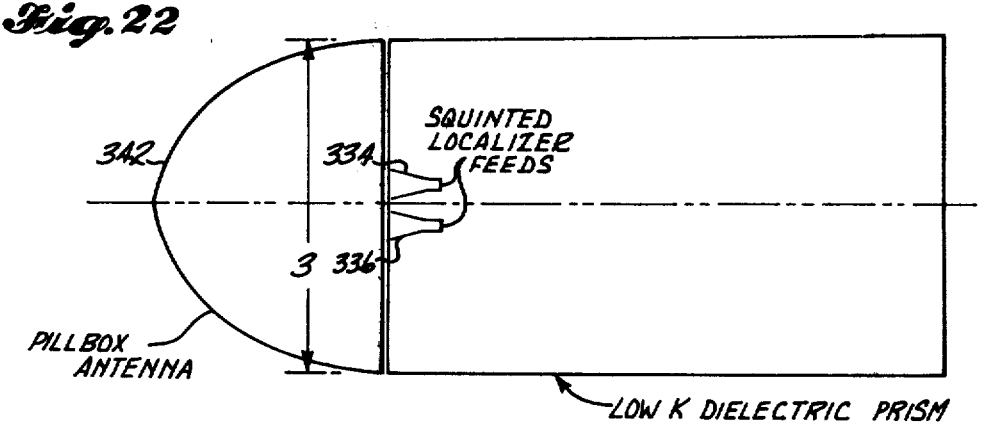
Figure 23:
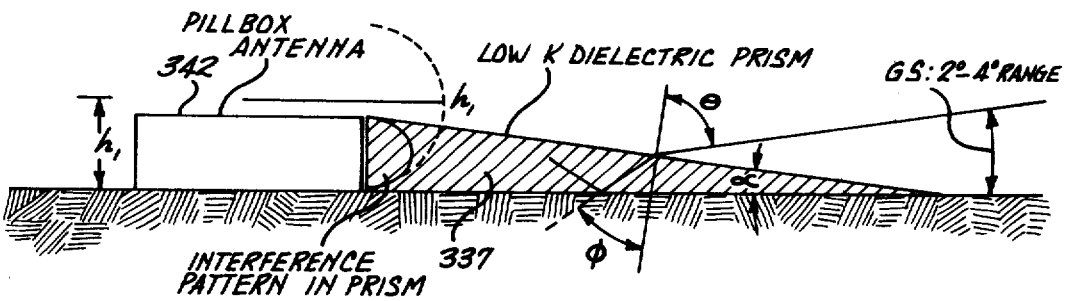

FIG. 19 shows flush mounted retro-target horn antennae in the runway at the touchdown point. Each horn is capable of receiving, audio-modulating and retransmitting an incoming radar pulse. The four horns together form four beams in space as the antenna in FIG. 4;

FIG. 20 shows the horns in a vertical cross section and the dielectric fill material in front of the horns to provide a smooth runway surface;

FIG. 21 shows an array of small horns generating the same beams as the larger ones of FIG. 20. This arrangement requires shallower trenches to be dug when installing the system;

FIG. 22 shows a top view of a low-silhoutte pillbox antenna which can be used with the present invention;

FIG. 23 shows a side view of the pillbox antenna of FIG. 22.

Turning now to FIG. 1, the transmitter T is seen typically positioned a short distance ahead of the landing field runway threshold L, and in line with the centerline $L_u$ of the runway L. The transmitter T produces four similar CW microwave energy beams grouped symmetrically about a desired glide path A—A representing the optimum approach path for an IFR (instrument flight rules) landing approach to the runway L. Two of the beams $F_1$ and $F_4$ are in vertical alignment along a plane V—V containing the axis A and the remaining two beams $F_3$ and $F_2$ are in a horizontal plane H—H containing the axis A. The beams $F_1$ and $F_4$ overlap each other at corresponding partial power points below peak beam intensity on the central axis of each beam, and the same is true of beams $F_3$ and $F_2$ respectively.

The function of the transmitter T, therefore, is to produce the two pairs of overlapping antenna pattern lobes or beams with each pair preferably at the same microwave energy frequency, and more specifically from the same microwave energy source. However, the continuous wave energy in each of the patterns $F_1$, $F_2$, $F_3$, and $F_4$ is modulated, the modulation frequency being different in and characteristic of each of the four beams, the modulation amplitude being substantially equal in opposing lobes, and the microwave carrier amplitude being approximately equal in the opposing lobes. The modulation frequencies used are preferably in the audio frequency range and so chosen as to minimize any likelihood of multiples or harmonics from one beam producing interference with the detection and separation of fundamental modulation frequency signals in the other beams of the array. Thus the energy in beam $F_4$ may be modulated, for example, at a frequency of 114 Hz, that in beam F at 70 Hz, that in beam $F_3$ at 150 Hz, and that in beam $F_2$ at 90 Hz. An airplane flying down the directional axis A—A will then receive modulated microwave energy with equal modulation amplitudes from opposing beams in both horizontal and vertical planes. If the airplane's flight position should stray upwardly from the axis A its guidance receiver will receive relatively more modulation envelope amplitude from the beam F, and less the beam $F_4$. The detected relative amplitudes of the modulation signals in these opposing continuous wave (CW) energy beams are then used to indicate the deviation from flight path on a suitable indicator device. Deviations to the right or left or below the glide path are presented to the pilot in a similar manner.

Turning now to FIG. 2, the transmitting means shown therein comprises a passive (no microwave energy source) system wherein the energy source comprises an airborne weather radar supplying energy to illuminate reflector 42 and provide pulsed CW energy in the waveguides 24, 26, 34, and 36. The energy in these waveguides is modulated in a manner hereinafter discussed and delivered respectively to radiator elements 24a, 26a, 34a, and 36a respectively.

These radiator elements comprise rectangular waveguide terminations mounted by suitable means illustrated as supported physically by a dielectric plate 40 in a cluster closely grouped about the focal point F of the parabolic dish reflector 42. Focal point F is located on the reflector axis A—A and lower radiators 24a and 26a are located closely above and closely below the axis A whereas the right and left side radiators 36a and 34a respectively are similarly located closely together adjacent opposite sides of the axis A, in a symmetrical relationship. By thus closely grouping the terminal or radiation ends of the four rectangular waveguides with their E planes in parallel relationship, and directing these radiations toward the antenna reflector 42, four slightly "squinted" overlapping beams $F_1$, $F_2$, $F_3$, and $F_4$ are produced as depicted in FIG. 1. As already indicated, the beams all have the same direction of polarization (i.e., horizontal in the example) and even though the waveguide radiator elements are located very closely together they are formed in a manner to be described so as to minimize the amount of cross talk between the resultant beams, i.e., appreciable energy from one waveguide coupled into the adjacent waveguides.

As shown in FIG. 4, a face view of the waveguide terminal configuration, it will be seen that the broad sides of the guide comprise an isosceles triangle having a noncritical apex angle which may, for example, be 90° as shown in FIG. 4, projecting beyond the terminal edges of the narrow sides of the guide which as shown in FIG. 5, terminate in a common transverse plane. Preferably also the projecting broad faces or walls $Wb_1$ and $Wb_2$ are both curved to flare outwardly toward their extremities in a curve such as a circular arc, this flare increasing the directivity of the guide as a radiator element. The narrow wall end edges $W_n$ terminating in a common transverse plane would have little effect on the radiation pattern from the guide even if extended beyond the base ends of the triangular broad wall extensions, so are conveniently terminated at the described location. With such a waveguide terminal form serving as the radiator element, it is found that the waveguides may be placed very closely together in order to achieve the very small angle of separation between the associated beam pairs. In the drawing, the waveguides are shown spaced farther apart than they are in practice, for convenience in illustration only.

Moreover, it is found that if just one broad wall of the waveguide endings is curved to produce the gain-increasing flare, cross talk between the beams is the result. By flaring both broad walls to their outer extremities approximately 25 decibels isolation is achieved between opposing beams. Typically the spread between the end extremities of the wall extensions $Wb_1$ and $Wb_2$ is approximately one electrical wave length, the waveguide E plane height being itself approximately a quarter wave length.

It will be appreciated that the energy beams produced by a paraboloid reflector 42 from each of these radiant energy sources maybe highly directional, i.e., of the order of two degrees beam width at the half-power points of each beam, and for a 3 centimeter system the paraboloid can still be relatively small in physical diameter, such as of the order of 4 feet across.

In order to modulate the pulsed continuous-wave energy being radiated from the waveguide terminals 24a against the reflector 42 (as shown in FIG. 2), a variable-impedance, solid state semiconductor device such as diode 101 is coupled from terminal 103 on a first side wall of waveguide 24 across the waveguide to the opposite side wall and a source of audio frequency current (not shown) of 114 Hz is connected to terminal 103 having an amplitude which is sufficient to materially vary the impedance or resistance of the diode 101 to alternately absorb and reflect microwave incident microwave energy at a rate of 114 Hz. For such purposes operation with diodes of type MA-47051 (manufactured by Microwave Associates) were found to perform satisfactorily in tests operating over their forward current range thereby providing "soft" diode characteristics. Screw tuner 105 which provides a sliding short at the other end of waveguide 24 (from radiator element 24a) being utilized to precisely tune waveguide 24 so that diode 101 becomes positioned an integral number of half wave lengths forward of tuner 105 at an open circuit point of waveguide 24 with respect to reflected energy from the wall of tuner 105 and either permit this reflected energy to pass out and be radiated by radiator element 24a or absorbed by diode 101.

An alternate arrangement for varying the amount of incident energy which entered waveguide 24 by way of reflector 42 is returned out of waveguide 24 at an audio rate of 114 Hz and radiated by radiator element 24a is shown in FIG. 6 where waveguide 24 has a diode 101 (which may comprise a type MA-47051) biased at approximately 0.5 volts to provide for "short circuit" operation (also at the 114 Hz audio rate by connection of an audio frequency source to terminal 103) and thereby in its lower impedance state act to reflect out energy coming into guide 24 while in its higher impedance state permitting incident energy to pass diode 101 and be absorbed at the far end of guide 24 by microwave energy absorbing media 204, e.g., consisting of a graphite-resin mixture. Microwave energy absorbing media 204 is required to be one quarter wave length long and positioned downstream from diode 201 so as to act as an absorber when required (when energy is passed by diode 101) and prevent return of energy out by way of radiator element 24a.

The audio frequency current amplitude may be increased to drive the diodes from open circuit to short circuit where one hundred percent modulation is desired. The energy absorbing diode type MA-47051 has a peak power rating of 10 watts for thus absorbing energy between switched conditions and these diodes are supported in the waveguides by a wall to wall type connector since the diode lengths themselves are too short to span the guides.

Similar terminations and alternative terminations are correspondingly associated with the waveguides 26, 34, and 36, however, the terminals of these respective guides are coupled respectively to sources respectively at frequencies 70 Hz, 150 Hz, and 90 Hz to produce similar modulation effects on the associated pulsed CW beams produced by the respective radiators. The modulation level is made the same in each of the opposing beams. For this equality to be maintained it is desirable that the microwave energy level incident in the opposing modulator cavities 34 and 36, and 24 and 26 be approximately equal also, because the impedance level of the diodes is also affected by the microwave energy level to which they are subjected.

To be continuously assured that the system is functioning properly and, therefore, that the modulation levels of the opposing pairs of antenna radiator elements are matched, there is provided at the apex of the paraboloid reflector 42 a window or aperture 42A which leads to an output waveguide 42B terminating in a detector 42C. The detector 42C comprises a solid state diode element 42D electrically connected to a suitable amplifying unit 60 feeding frequency selective filters tuned to the respective modulation frequencies and connected to a control circuit 62. The control circuit 62 in turn arranged to energize the coil 64A of the relay 64 in response to an unbalance in the modulation levels detected from either of the opposing beam pair components so as to energize a warning light 66 or operate an appropriate actuation unit which removes the landing system from the air and renders it inoperative so that an airplane is not misguided by false guide path signals which do not accurately define the desired approach line.

Turning now to FIG. 19 there is shown at or near touchdown on the centerline of the runway an alternative modulated retrodirective antenna arrangement comprising four reflectors 301, 302, 304, and 306, the pair 301 and 302 aligned along the runway providing vertical guidance, and the pair 304 and 306 positioned transverse to the runway providing horizontal guidance. Each of these horn antenna reflecting elements 301, 302, 304, and 306 has a switching diode in the throat thereof (not shown) arranged as shown in FIG. 6. The diodes in the respective horns 306 and 304 are switched at 150 Hz and 90 Hz respectively while the diodes in horns 302 and 301 are switched at the frequencies 114 Hz and 70 Hz respectively thus modulating the backscatter signal amplitude returned to the illuminating radar in a pattern similar to that provided by the retrodirective modulating antenna system of FIG. 5. A sectional view of the runway shown in FIG. 20 shows how the horns 301 and 302 are positioned flush or semi-flush (height above surface less than 1.5 inches) in the runway surface to preserve riding qualities during rollout. Horns 301, 302, 304, and 306 are about 9 inches in diameter for X-band illuminating radar or 3 inches in diameter for use at Ka band radar frequencies. Instead of a single horn 301 modulated at a switching frequency of 70 Hz, an array of segmented horns 310 (as shown in FIG. 21) each modulated at 70 Hz may be used in accordance with travelling wave array techniques or trough guide or slotted waveguide techniques may be utilized in forming an array modulated at 70 Hz instead of a single horn 301 as shown in FIG. 20. Segmented horns 312 all modulated at 114 Hz in the same manner as shown in FIG. 21 may be used in place of a single horn 302 shown in FIG. 20. Segmented horns 310 and 312 are 3 inches in diameter for X-band illuminating radar while for Ka band radar a 1 inch diameter is used.

Turning now to FIG. 22 yet another modulated retrotarget antenna arrangement is shown wherein modulated horns 336 and 334 correspond to waveguides 36 and 34 of the modulated retrodirective antenna arrangement of FIG. 5 and reflector 342 corresponds to reflector 42 in FIG. 5. The low silhouette pill box type retrotarget of FIG. 22 shown in cross section in FIG. 23 (without the feedhorns 334 and 336 modulated at 90 Hz and 150 Hz respectively) has a low dielectric prism 337 which refracts the incident illuminating wave to produce a steeper grazing angle and thus a lower interference pattern. The pill box antenna arrangement of FIGS. 16 and 17 has a horizontal aperture designed to 2° to 4° beams widths and a vertical aperture set to match the interference pattern behind the prism.

The radar cross sections $\sigma = GA = (4\pi/\lambda 2) A^2 \approx (4\pi/\lambda 2)(h, w)^2$ $h$ = height of pillbox where w = width (see FIG. 22)
G = gain factor
A = aperture in $M^2$
$\lambda$ = wavelength of incident radar wave
NOTE: $h \times w = A$ The prism angle $\alpha$ (alpha) and dielectric constant K in this retrodirective antenna arrangement is set to produce maximum refraction without exceeding the limit set by the total internal reflection of the return ray:

$\theta_{MAX} = SIN^{-1} 1/K$

Figure 17:
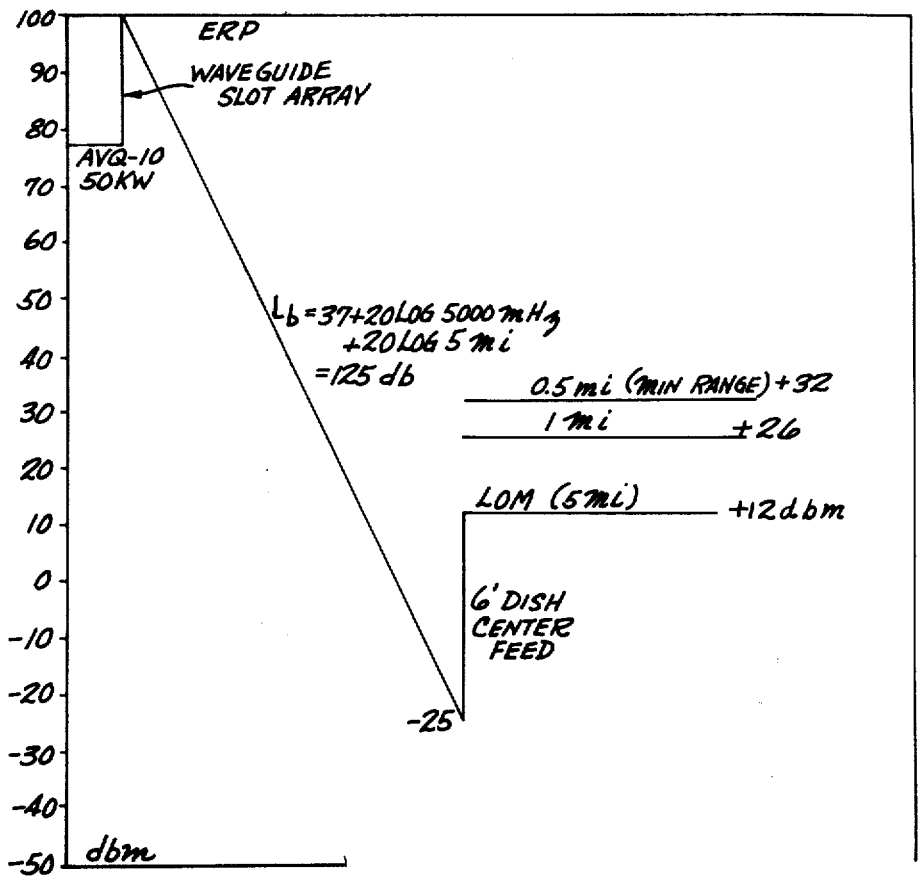
FIG. 17 is a chart showing AVQ weather radar field strengths and power available at a modulating diode in a retrodirective antenna system helpful in understanding the signal levels and range of the present system.

The preceding description is illustrative of a plurality of modulated retrodirective antenna systems which comprise the land based portion of the present ILS system. Turning now to FIG. 17 an appreciation may be had of the significance of the problems inherent in present system utilization with an available R. C. A. (Radio Corporation of America) type AVQ-10 weather radar having a peak transmitter power of 50 kilowatts as the airborne illuminating source of microwave energy. A power plot of microwave energy levels to a six-foot center fed dish with a Hewlett Packard type 415E meter shows the amount of energy incident from such source on a microwave diode (type IN23C) mounted therein (in a similar arrangement to that shown in FIG. 5). This chart showing energy from the 50 kilowatt illuminating source (the airborne AVQ-10) incident on the diode shows the reflected power received at ranges of ½, and 5 miles.

The graph of FIG. 17 shows diagrammatically the overall system performance indicating received power levels of the chosen range (5 miles). In the example the signal to noise (S/N) ratio is 20 db which is in excess of the minimum usable signal. Further improvements may be obtained by narrowing the I.F. filter in the receiver and by lowering the receiver noise figure. Such additional modifications may yield up to 15 miles range.

Figure 18:
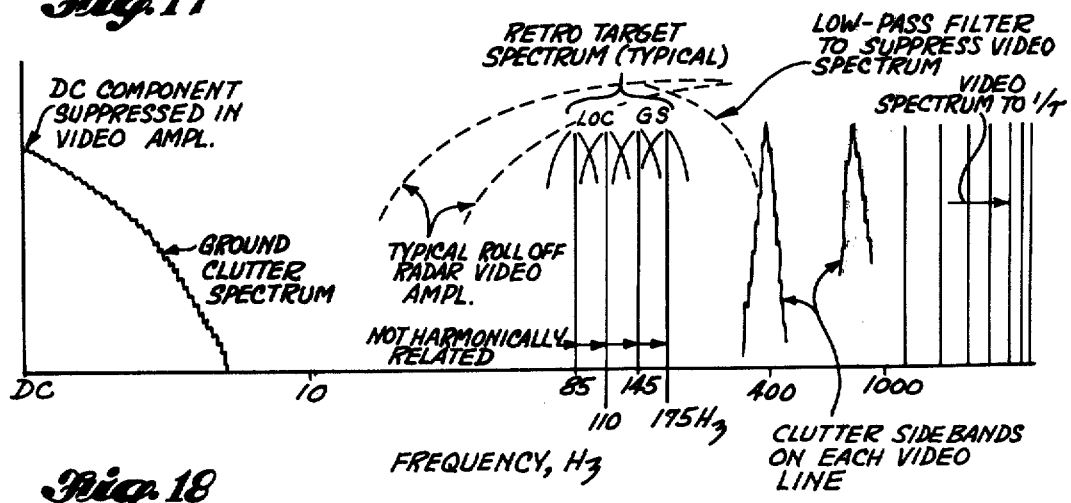
FIG. 18 shows the kind of filtering of the radar receiver video required in the present system.

The above discussion relates to power available for illumination however a further important consideration is the requirement of filtering the radar video to obtain therefrom the requisite localizer and glide slope signal information in the receiver. An appreciation of the radar video bandpass characteristics and the position of the localizer and glide slope signal information components relative thereto as shown in FIG. 18 is helpful in understanding the type of low pass filtering necessary to obtain the requisite localizer and glide slope signal components for use in the modified weather radar system hereinafter described.

Turning now to FIG. 12 it is seen how unwanted ground clutter is eliminated which might otherwise cause overloading of the receiver or produce possibly unwanted harmonics. To achieve the elimination of ground clutter the receiver is deliberately deadened at all ranges except at the target range. The deadening is achieved by an inverse bias reducing receiver gain to zero. The enabling or "make alive gate" is a pulse gate causing cancelling out of the D.C. bias during the pulse width. The enabling pulse is locked to the target distance (time) and will thus track the live zone of the receiver.

It is desired to obtain directional guidance (ILS type) from the weather radar during final approach with minimum changes and modifications of the present known radar systems, e.g., the R. C. A. type AVQ-10 mentioned earlier. The weather radar antenna 501 shown in the present modified weather radar system illustrated in block diagram form in FIG. 7 may be utilized with the rotating means stopped and the antenna pointed straight ahead. An alternative if desired is to use a small 15 db pickup antenna 503 pointed straight ahead (along an axis parallel to the longitudinal axis of the aircraft) which is coupled by directional coupler 505 into the input waveguide 507 of duplexer 509. A four channel audio filter 511 and rectifier and comparator circuits 513, 515 (shown in more detail in FIG. 15) are needed to drive the cross pointer indicator (CDI) 517 which can be a standard meter having a plus or minus 150 microamp movement. To compensate for range changes in signal level an AGC provision is utilized. The normal AGC of the weather radar receiver holds the signal with approximately 10 db. This is not sufficient for satisfactory performance in the present application and as a consequence the STC (sensitivity time control circuit) of the receiver (a potentiometer in the weather radar receiver) is adjusted so that a sensitivity proportional to (range)$^{+4}$ is achieved. A ramp voltage as shown in FIG. 13 is applied to the STC circuit and the plot of receiver sensitivity with time shown in FIG. 14 is thereby achieved. This ramp voltage 520 is shown applied to terminal 522 of the STC circuit (see FIG. 16). In one way type systems, such as the conventional ILS, the (range)$^{-2}$ law holds however the present (range)$^{-4}$ law mentioned earlier makes the above described STC provision doubly important.

Figure 8:
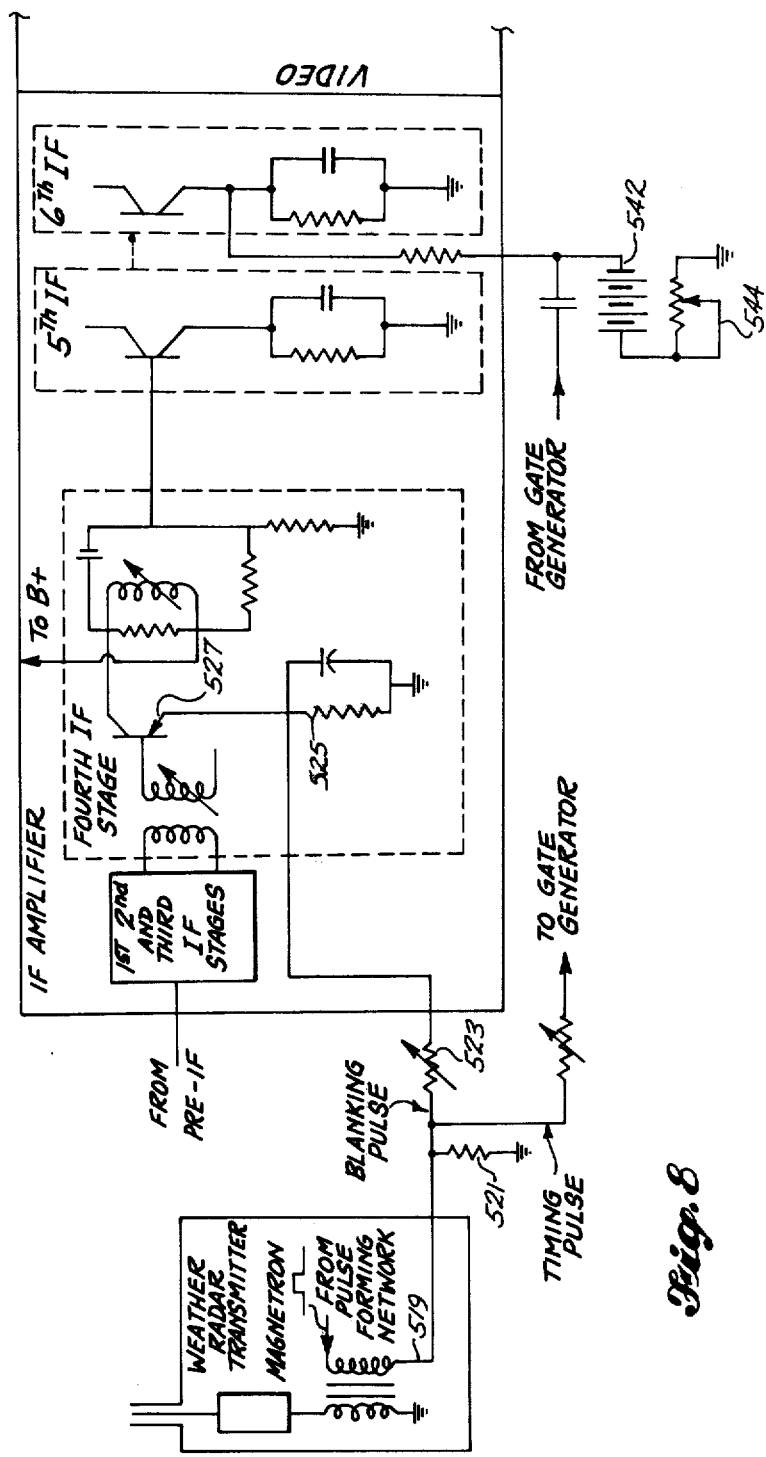
FIG. 8 is a partial block and schematic diagram of the system of FIG. 7 showing blanking pulse and enable pulse utilization in the I.F. amplifier portion of the system.

Now, at short ranges (less than 10 microseconds) present weather radars have poor performance due to a variety of saturation and fast response problems. Main pulse blanking must therefore be provided to protect the receiver from saturating and allowing the receiver to receive close-in echoes almost immediately. The receiver modification shown partially in block and partially in schematic form in FIG. 8 shows one manner of achieving main pulse blanking. The blanking pulse is taken across voltage dropping resistor 521, the resistor 521 being connected in series with the primary 519 of the pulse transformer. Resistor 523 is connected in series between the primary 519 and bias resistor 525 for fourth I.F. stage transistor 527 and prevents excessive shunting of the bias resistor 525 in the fourth I.F. stage amplifier circuit and shunt resistor 521 and series resistor 523 are chosen to satisfy the following requirements:

1. an adequate amplitude blanking (shut-off) pulse must be supplied to the fourth I.F. stage, and
2. the proper operating conditions of the fourth I.F. amplifier stage is required to be maintained during the pulse-off time.

The above I.F. amplifier blanking is used to prevent the transmitted pulse in the system from deadening the receiver due to overload. In normal radar applications, e.g., weather radar where close ranges from several hundred feet to thousands of feet are of no interest, receiver blanking due to main pulse leakage can be tolerated. However, in the present system close range information is desired and deadening of the receiver is prevented by the above developed and described blanking pulse applied to the fourth I.F. stage of the weather radar receiver system. FIG. 9 is illustrative of receiver sensitivity without blanking and FIG. 10 may be compared therewith showing receiver sensitivity with the main pulse blanking modification.

Tests on both C-band and X-band weather radar systems have shown that there are alternate points in the receiver circuit where a blanking pulse may be applied and utilized to protect the receiver from saturating and allowing the receiver to be ready to receive closein echoes almost immediately termed "main pulse blanking" of the receiver viz. to the Pin diodes just after the TR tube, mixer crystal blanking, or simultaneous blanking of a plurality viz. two or three of the first several I.F. stages in the receiver.

Figure 7:
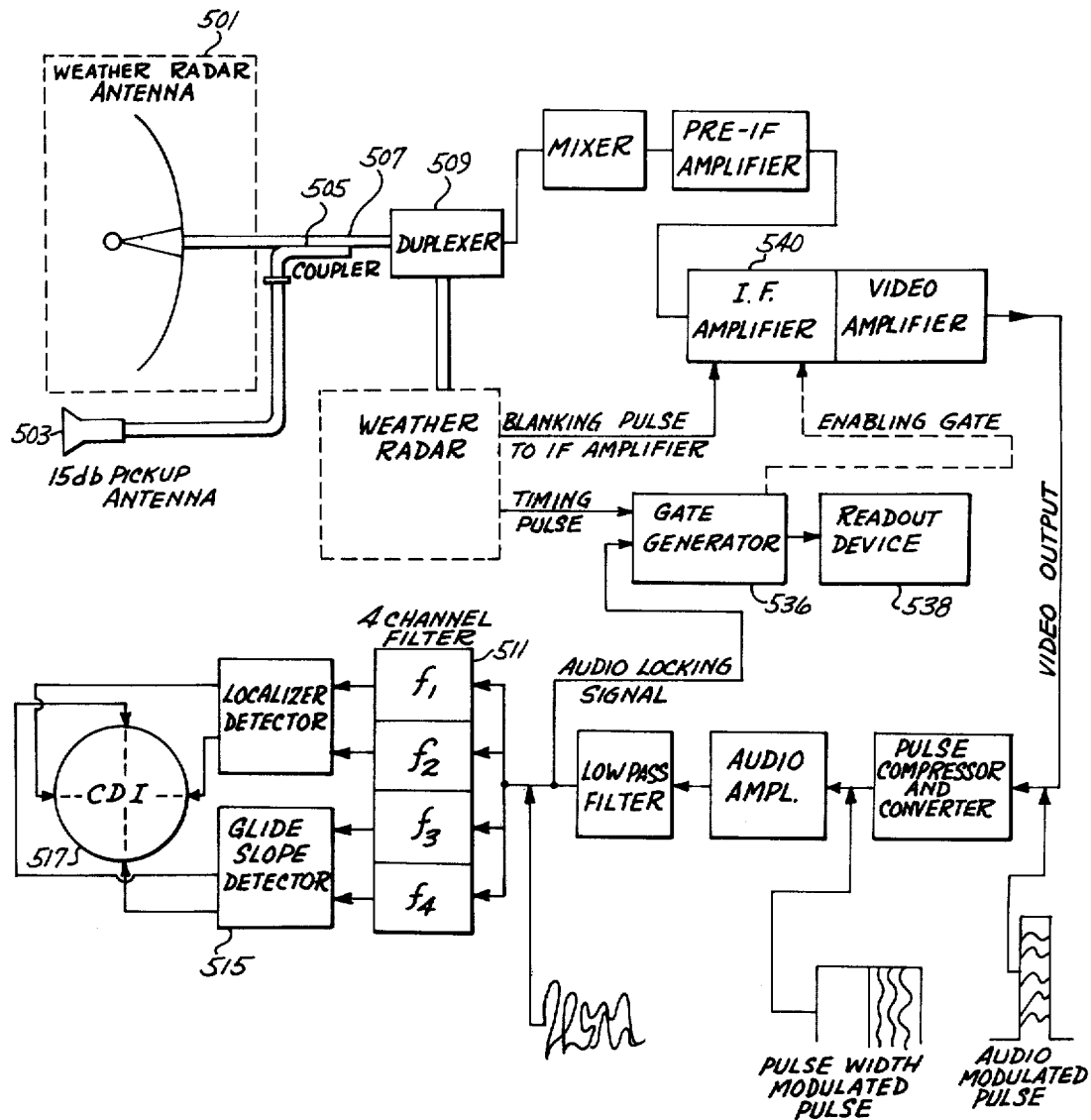
FIG. 7 is a block diagram of a modified weather radar system adapted for ILS guidance mode of operation.

Referring now to FIG. 8 it will be seen that a timing pulse is developed from the weather radar transmitter magnetron modulator transformer primary 519 in the same manner that the blanking pulse was developed therefrom. This timing pulse is applied to gate generator 536 (as shown in FIG. 7) which comprises a delay type measuring circuit (ramp generator) which generates an adjustable ramp referenced to the timing (main) pulse from the radar transmitter (see FIG. 11). The time delay between the timing pulse and the reflected signal is a range measure (a voltage) as long as the gate generator is locked on the reflected signal (here an audio locking signal derived from video signal processing and applied to the gate generator). Readout device 538 converts the measured time delay (converted to a voltage) into a displayed digital or analog representation. The signal locked gate of gate generator 536 can also be utilized to provide an enabling gate pulse which is coupled to the I.F. amplifier 540 as shown in FIG. 7 and more particularly to the sixth I.F. stage thereof in the manner shown in FIG. 8 thereby providing a great reduction of ground clutter interference. When used the enabling pulse from the gate generator 536 overrides the D.C. bias 542 connected to the particular I.F. stage (sixth I.F. stage in this case) which previously made the stage inoperable and overrides this D.C. bias 542 during the pulse duration. Since the pulse is locked onto the audio signal of the reflected (target) pulse, the receiver is dead to all ground clutter and sees only the wanted signal. D.C. bias voltage at 542 is set to a predetermined level so that the sixth I.F. amplifier is just beyond cutoff (no signal transmitted through this I.F. stage). This level of D.C. bias is approximately 20 volts D.C. for a typical transistor I.F stage.

A clearer appreciation of the function of the enable gate in the receiver system can be seen on reference to FIG. 12 which shows receiver operation under the influence thereof, particularly how the enabling gate is used to track the reflected signal in time so that the receiver sees signals only during the gate length.

A circuit modification of an AVQ–10 type radar I.F. amplifier is shown in FIG. 16 showing generation of an enable gate which is utilized to turn on the fourth I.F. stage (instead of the sixth as shown in FIG. 8). A quarter wave gating circuit 581 is coupled from the input 583 of the I.F. amplifier to initiate a delayed gating of the enable pulse provided by pulse generator 546. Circuit 581 is a delay line type circuit which permits adjustment of delay of the gating pulse.

A block diagram of video signal processing is shown in the system of FIG. 7 and waveshapes are shown which are illustrative of the signal processing however FIG. 15 shows a complete channel of signal processing (guide slope channel) from video input through to CDI display 517 readout and may be referred to for the following detailed circuit description thereof. The video output of the weather radar receiver is coupled to the video input terminal 602 of pulse compressor and converter 604 having an input impedance of 100 K ohms and amplitude modulation of the modulated pulse signal shown results in the pulse width modulated signal shown which is coupled to audio amplifier circuit 606 which provides an amplified 30 volts level signal (as shown) to a low pass filter 608 having an input impedance of 3 K ohms and a cutoff frequency of 200 Hz. This signal processing of the video results in the application of a one-volt level signal to the four channels of audio filter 511 wherein the first channel filter $f$ is set to pass the 85 Hz audio signals, the second channel filter $f2$ is set to pass the 103 Hz audio signals, the third channel filter $f3$ is set to pass the 145 Hz audio signals, and the fourth channel filter $f4$ is set to pass the 175 Hz audio signals, the respective filters having input impedances of 5 K ohms. Balancing attenuators 610 and 612 and 40 db audio amplifiers 614 and 616 are provided in the respective 175 Hz and 145 Hz glide slope channels to provide signal equalization in the glide slope channels without amplitude distortion between signals. Eight millivolt signals applied to the 40 db ($10 \log (8/8 \times 10^{-3}) = 40$ db approx.) audio amplifiers having 100 K ohms input impedances provide 8 volts output signals, amplifiers 614 and 616 having 3 K ohms output impedances. Comparator circuits 513 and 515 provide rectification of the respective audio signals to D.C. levels for coupling to the glide slope inputs of the CDI. The values of components used successfully in comparator 513 and given here by way of illustration included:

| Resistors | Capacitors |
|---|---|
| 701 = 10 K ohms | 801 = 1.0 microfarad |
| 703 = 5 K ohms | 802 = 10 microfarad |
| 705 = 2 K ohms | 811 = 500 microfarad |
| 707 = 44 K ohms | |
| 709 = 5 K ohms | Transistors |
| | 902 = FET type 2N5181 |
| Diodes | |
| 901 = type IN34 | |

While the manner of coupling from the outputs of the $f3$ and $f4$ audio filters to the CDI is shown in FIG. 15, the circuitry from the outputs of the $f1$ and $f2$ audio filters of four channel audio filter 511 to the localizer input of the CDI is the same and is not shown to avoid repetition in this description.

Certain changes in the airborne receiver-transmitter may be made to supply energy to the modulated ground based reflector antenna arrangement and other changes in the receiver to derive guidance information from the modulated retrodirective array without departing from the spirit and scope of the invention as defined by the appended claims.

We claim:

1. A microwave guidance system for landing an airplane comprising in combination:
   ground-based reflector means;
   an airplane based weather radar receiver and transmitter, said receiver including a sensitivity time control circuit adjusted to provide a sensitivity proportional to range $^{-4}$, said transmitter providing pulsed continuous wave energy for illuminating said ground based reflector means;
   said ground based reflector means including means for tone modulating said pulsed continuous wave energy at a plurality of audio frequencies;

means coupled to said weather radar receiver for detecting the relative amplitudes of said tone modulated pulsed continuous wave energy at said plurality of audio frequencies and indicating the deviation of the airplane from flight path;

and further including:

gate generator means in said receiver for generating an adjustable ramp referenced to the main pulse from said transmitter;

means for locking said gate generator on the reflected signal;

means for deriving an enabling gate pulse from the signal locked gate of said gate generator means; and means for coupling said derived enabling gate pulse to I.F. stage of said receiver thereby providing reduction of ground clutter interference.

* * * * *

UNITED STATES PATENT AND TRADEMARK OFFICE
CERTIFICATE OF CORRECTION

PATENT NO. : 3,908,189
DATED : September 23, 1975
INVENTOR(S) : Walter E. Buehler
Clarence D. Lunden It is certified that error appears in the above-identified patent and that said Letters Patent are hereby corrected as shown below:

In the heading of the patent, insert -- [73] Assignee: The Boeing Company, Seattle, Wash. --.

Signed and Sealed this second Day of December 1975

[SEAL]

Attest:

RUTH C. MASON
*Attesting Officer*

C. MARSHALL DANN
*Commissioner of Patents and Trademarks*